United States Patent [19]

Chan et al.

[11] Patent Number: 4,537,807

[45] Date of Patent: Aug. 27, 1985

[54] BINDER FOR PRE-MOISTENED PAPER PRODUCTS

[75] Inventors: Lock-Lim Chan, Willowdale; Patrick W. Lau, Scarborough, both of Canada

[73] Assignee: The Borden Company, Limited, Willowdale, Canada

[21] Appl. No.: 600,543

[22] Filed: Apr. 16, 1984

[30] Foreign Application Priority Data

Nov. 18, 1983 [CA] Canada ............................ 441431

[51] Int. Cl.$^3$ ............................................ B32B 7/10
[52] U.S. Cl. ................................... 428/74; 206/812; 427/342; 427/391; 427/421; 428/290; 428/511; 428/913
[58] Field of Search ............ 427/342, 391, 421; 428/290, 511, 913, 74; 206/812

[56] References Cited

U.S. PATENT DOCUMENTS

| | | | |
|---|---|---|---|
| 3,438,808 | 4/1969 | Hawkins et al. | 117/155 |
| 4,117,187 | 9/1978 | Adams | 428/286 |
| 4,309,469 | 1/1982 | Varona | 428/290 |
| 4,343,403 | 8/1982 | Daniels et al. | 428/290 |

FOREIGN PATENT DOCUMENTS

| | | |
|---|---|---|
| 948802 | 6/1974 | Canada . |
| 1104026 | 5/1981 | Canada . |
| 1109758 | 9/1981 | Canada . |

57-117867  7/1982  Japan .

OTHER PUBLICATIONS

R. F. Nickerson, *Thickening of Poly(vinyl Alcohol) by Borate*, J. Applied Polymer Science, vol. 15, pp. 111–116, (1971).

Chemical Abstracts, Poly(vinyl Alcohol) Film Containing Boric Acid for Sanitary Napkins, 97:150768y, (1982).

*Primary Examiner*—James J. Bell
*Attorney, Agent, or Firm*—George P. Maskas; Kenneth P. Van Wyck

[57] ABSTRACT

A premoistened towelette or wiper type paper product having high wet strength when stored in an acidic pH medium and during usage and lower wet strength when immersed in a neutral or alkaline pH medium for disposal in conventional sewage systems comprising a non-woven fibrous web which is treated with an improved polymeric binder comprising a copolymer of glyoxal and polyvinyl alcohol which maintains high wet strength when stored for sustained periods of time in acidic pH wetting medium conventionally used for external cleansing of the human body and during usage and yet which will readily break-up during flushing. This instant invention also comprises a method of treating non-woven fibrous webs with the improved glyoxalated polyvinyl alcohol copolymer binder and drying prior to wetting in an acidic, e.g. boric acid medium.

21 Claims, No Drawings

BINDER FOR PRE-MOISTENED PAPER PRODUCTS

BACKGROUND OF THE INVENTION

The present invention relates to improved disposable, wet packaged or premoistened paper products, which have superior wet tensile strength at acidic pH and yet which have substantially reduced wet tensile strength at neutral or alkaline pH for ready disposal. These paper products, which are generally used for skin cleansing, are known commercially as towelettes, wet wipes or fem-wipes, and are formed from paper or non-woven fibrous webs which are treated with an improved polymeric binder which gives substantially higher tensile strength compared to prior art binder treated products when stored in an acidic wetting medium and during usage yet which exhibited substantially reduced strength when disposed in neutral or alkaline pH medium. The invention also related to a method of preparing an improved strengthened premoistened paper product through treatment of fibrous web material with an improved polymer binder prepared by the reaction of glyoxal and polyvinyl alcohol prior to drying and then wetting of the treated paper product with an acidic solution.

Current premoistened paper products are prepared by treating paper or fibrous webs, which have been prepared by conventional paper manufacturing processes, with various polymer binders to impart a degree of wet strength to the web when packaged in contact with an acid aqueous medium. These wet tissues or cleansing products are normally stored in sealed packages until used, thus requiring that they maintain their strength during storage and use and yet be readily disposable when flushed in plain water without clogging of typical plumbing and toilet equipment.

Various binders and processes for the manufacture of premoistened paper products have been proposed in the prior art. Thus, for example, U.S. Pat. No. 4,117,187 to James W. Adams discloses a premoistened wipe prepared through use of an acid-insoluble, alkali-soluble polymeric polycarboxylic acid and functional derivative thereof wherein the acid is dissolved in water and enough alkali is added to substantially neutralize all acidic groups prior to application to the fiber web. The binder saturated web is dried and then immersed in a low pH medium to effect an association reaction between the carboxylic group and the cellulose of the web, presumably through hydrogen bonding. These hydrogen bonds provide a reasonably strong linkage in acidic medium and yet will break-up when the wipe is immersed in a sufficiently high pH liquid medium.

Canadian Pat. No. 948,802 to David V. Duchane discloses a non-woven fibric wrapper from rayon fabric formed by conventional wet lay or dry lay processes which is first treated with a cold water soluble polyvinyl alcohol binder, e.g. by spraying, and then oversprayed with a solution of gelling or insolubilizing agent such as borax, to crosslink at least the surface area of the polymer binder before heating to dry to give a water resistant web. Thus Duchane utilizes the complexing reaction between borax and polyvinyl alcohol under heating to give wet strength in an acidic moist environment and yet disposability through dissociation of the polyvinyl alcohol-borax complex upon soaking in excess neutral water. This complexing reaction between borax and polyvinyl alcohol is similar to complexing between boric acid and polyvinyl alcohol as disclosed in R. F. Nickerson in Appl. Polymer Science 15, 111, (1971).

Canadian Pat. No. 1,109,758 to Gerald Miller similarly discloses the use of the reaction of a polyvinyl alcohol binder and boric acid or soluble salts thereof to form complexes having di-diols cross-linkages which are of a gel nature for binding the web. As disclosed in the above mentioned article of R. F. Nickerson, the borate ion is the effective crosslinking agent for the polyvinyl alcohol, and boric acid, at concentrations greater than 0.03 M as in Miller's patent, contributes sufficient amounts of borate ions to provide a gel type complex for binding the web as in the above mentioned Canadian patent of Duchane.

Canadian Pat. No. 1,104,026 to Daniel et al. discloses the use of a dried emulsion of a vinyl acetate-ethylene copolymer binder containing cold water soluble polyvinyl alcohol as a protective colloid with boric acid, which is used to temporarily insolubilize the binder. The polyvinyl acetate or ethylene-vinyl acetate copolymers have no known reaction with boric acid. It is the presence of the polyvinyl alcohol in the emulsion as protective colloid which forms a complex with the boron ions of the boric acid in the same manner as taught in the above patents of Duchane and Miller.

The instant invention has, through the use of a unique glyoxalated polyvinyl alcohol copolymer binder for pre-moistened paper products, achieved a substantially higher wet strength wiper when wetted in acidic medium than that achieved with prior art binders, as shown in comparison examples, and yet which maintains equal or better disposability in neutral pH water.

SUMMARY OF THE INVENTION

A premoistened towelette or wiper type paper product having high wet strength when stored in an acidic pH medium and during usage and lower wet strength when immersed in a neutral or alkaline pH medium for disposal in conventional sewage systems comprising a non-woven fibrous web which is treated with an improved polymeric binder comprising a copolymer of glyoxal and polyvinyl alcohol which maintains high wet strength when stored for sustained periods of time in acidic pH wetting medium conventionally used for external cleansing of the human body and during usage and yet which will readily break-up during flushing. This instant invention also comprises a method of treating non-woven fibrous web, such as cellulosic webs with the improved glyoxalated polyvinyl alcohol copolymer binder and drying prior to wetting in an acidic, e.g boric acid medium.

It is the principal object of this invention to provide a pre-moistened towelette paper product having substantially higher wet strength than prior art towelettes when stored for sustained periods of time in acidic medium and yet which is readily disposed of by flushing in excess neutral pH medium in conventional plumbing and toilet facilities, particularly when used for bathroom or toilet tissue.

It is also an object of this invention to provide an improved binder and a method of use thereof in preparing a pre-moistened towelette paper product of improved wet strength.

These and other objects of this invention will become apparent from the following detailed description of the invention.

DETAILED DESCRIPTION

The paper or non-woven fibrous webs of this invention are of the type commonly used in the art of conventional pre-moistened flushable wipe towelettes, wet wipes, fem-wipes, toilet tissue and the like. The fibrous webs are prepared by conventional paper manufacturing processes and are usually formed of a combination of relatively short cellulosic fibers e.g. 1/16 in.—½ in., with longer fibers which provide a degree of increased strength for the web. These fibrous materials lack substantial mechanical strength and require adhesive binders distributed uniformly over the web to impart wet strength to the wipes under conditions of storage and use at low pH and yet which will weaken and disintegrate when flushed in neutral or high pH medium.

In accordance with this invention, the fibrous web or paper is treated with an improved polymeric binder adhesive formed from the reaction of a polyvinyl alcohol with a dialdehyde, glyoxal, or dialdehyde of the general structure

wherein R is alkyl, aryl or cycloalkyl, with or without substitution on the group, e.g glutaraldehyde and 2-hydroxyadipaldehyde, etc., with glyoxal being the preferred dialdehyde, for production of a wipe which has substantially higher wet strength than prior art binder treated wipes when stored and used in a low pH medium and yet which maintains disposability, i.e. disintegrates when disposed of in neutral or high pH medium which is at least equivalent to that of prior art wipes.

The improved polymer binder of this invention, which shall hereinafter be described in terms of Applicants' preferred binder, is a copolymer prepared by the reaction of glyoxal,

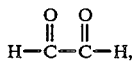

with a hot water soluble polyvinyl alcohol of the form

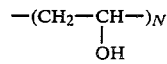

wherein N is the number of repeating structure units to give a glyoxalated polyvinyl alcohol copolymer which can be represented by the following structural formula:

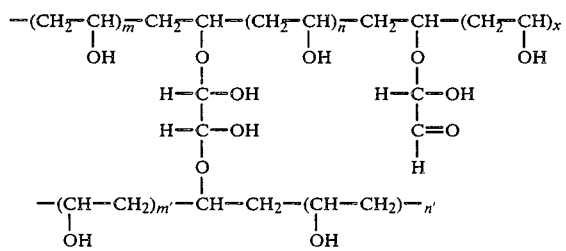

wherein m, n, x, m' and n' are integers representing the number of repeating structural units.

The glyoxalated polyvinyl alcohol copolymer of this invention can be applied to the paper or non-woven material in any desired conventional method such as by spraying, immersion, saturation or printing onto the material and then drying by conventional paper drying methods. The web is cut to the desired size, either prior to or after treatment with the binder, and the binder treated webs are then wetted with a low pH medium having a pH which is within acceptable limits for use on the body. The binder treated web can be either prewetted and packaged in a sealed package as in the case of towelettes, or folded and packaged wet in contact with a low pH aqueous medium in a sealed package until used.

The acid medium used in the practice of this invention can be any low pH mineral or organic acid medium conventionally used for cleansing skin at pH of 2.0 to 6.0 and more commonly pH 3.0 to 5.5 depending upon the concentration of acid used, such as boric acid, dilute phosphoric acid, fumaric, oxalic, malic, dilute HCl, etc. Boric acid is preferred since wipes in boric acid exhibit improved resulting wet strength over wipes which have been wetted with other low pH wetting medium. Boric acid in aqueous media containing a concentration of from 1–5% boric acid, and preferrably 4–5% boric acid, have been found to give optimum wet tensile strength when used at levels of about 12% boric acid on a dry weight of acid to dry weight of paper/fibrous web.

The acid wetting medium may also contain other conventional ingredients such as surface active detergent, humectants, bactericides, emulsifiers and scenting or perfuming agents can also be used without detrimental effect upon the unique binder of this invention.

The unique polyvinyl alcohol and glyoxal copolymer binder of this invention is prepared by the condensation reaction of glyoxal and a polyvinyl alcohol in a ratio of from not less than 1:1 to no more than 1:8 by dry weight, with a ratio of 1:1 to 1:4 being preferred. The polyvinyl alcohol used for reaction with glyoxal can be any commercially available polyvinyl alcohol having a degree of hydrolysis ranging from 87 to 99% and viscosities ranging from 4 cps to 70 cps for a 4% solution at 20° C. Polyvinyl alcohols which are hot water soluble with a degree of hydrolysis of 87–89% and a viscosity of 40 cps (4% solution at 20° C.), available for example from Dural Products Limited, Toronto, ONTARIO, CANADA, under the Tradename Covol 9740 TM, are preferred. The Covol polyvinyl alcohols are available in ranges of hydrolysis of 87–89% (the "97" series in the first two numbers with the last two numbers e.g. "40" being the viscosity in cps. when measured at 4% solid at 20° C.) and 98–99% hydrolysis (the "98" series, with viscosities up to 70 cps.) and have all been found to have utility in preparing the preferred binder of this invention.

The preferred glyoxal-polyvinyl alcohol copolymer binder of this invention has a polyvinyl alcohol to glyoxal ratio of 4:1 on a dry weight basis and is prepared with a hot water soluble polyvinyl alcohol with a degree of hydrolysis of 87–89% and a viscosity of 40 cps. at 20° C. for a 4% aqueous solution. The copolymer is conventionally prepared by the following manufacturing procedure which is outlined as follows:

| Materials Reactants | % by Weight |
| --- | --- |
| 1. Water | 69.4 |
| 2. Covol 9740 TM | 6.4 |
| 3. Glyoxal (40% solution) | 4.0 |
| 4. Sodium hydroxide (25% solution) | 0.2 |
| 5. Water | 20.0 |
| | 100.0 |

Procedure

A. Set condenser for reflux and return if reactor is used.

B. Charge water (1) to reactor. Mix at maximum speed. Heat to 80° C.

C. At 80° C., start adding Covol 9740 TM (2) slowly in small portions to the reactor with mixing to help the dispersion in the warm water. It takes about 20–30 minutes for the complete addition of Covol 9740 TM.

D. Let temperature rise to about 90° C. during and after the addition. Keep at 80°–90° C. with stirring until Covol 9740 TM (2) has completely dissolved. This will take about 30–45 minutes time.

E. After Covol (2) has dissolved, the solution is cooled slowly back to 25°–30° C. with stirring.

F. At 25°–30° C., glyoxal 40% (3) is added in slowly with stirring.

G. Stirring is continued for another 5 minutes after the addition of glyoxal (3). Then the pH of the solution is adjusted to 5.5–5.7 with sodium hydroxide solution (4).

H. After the pH is adjusted, the solution is stirred at 25°–30° C. for another 10 minutes.

I. Water (5) is then added and stirred at 25°–30° C. for another 2½ hours. During this period, Brookfield viscosity is measured every 30 minutes. (LV3/60/25° C.)

J. After the stirring period, the batch is screened through 60 mesh screen and can be drummed off.

The final product should have the following properties:

| | |
| --- | --- |
| Brookfield viscosity = (spindle #3 at 60 rpm at 25° C.) | 380–480 cps (freshly made) |
| Solid content = | 8.0 ± 0.5% |
| pH at 25° C. = | 5.4–5.8 |
| S.G. at 25° C. = | 1.028–1.032 |
| Gardner colour = | 1–2 |

The glyoxalation of polyvinyl alcohol can be carried out at a pH medium ranging from about 1 to 6, while the reaction temperature can vary from about 20° to about 80° C. The reaction time may vary from 20 minutes up to 24 hours until an end point viscosity of the binder solution of from 10 to 1000 cps is reached. The concentration of the final copolymer binder solution can be within the range of 1–10%, depending upon the specific polyvinyl alcohol reactant used.

THE APPLICATION METHOD

Paper to be treated with the binder described in this invention can be made by conventional papermaking processes. The treatment of paper or other non-woven products by this glyoxalated polyvinyl alcohol binder can be made by impregnation, by spraying or by imprinting, depending on the choice of the papermaking companies. Depending on the amount of wet strength required to be imparted onto the paper, the preferable range of resin pick-up level varies from at least 0.5 to 3.0%.

The treated paper is then dried by conventional drying processes. Following drying, the treated paper can then be cut to desired size sheets for the intended use. These sheets can be packaged individually or in numbers, preferably in folded form, in moisture-proof containers. The folded and binder treated sheets can be wetted with boric acid solution prior to being placed into the container, or the appropriate amount of boric acid can be injected into the envelopes containing such folded sheets. Preferably, the boric acid needed should be about 12% based on dry weight of acid to dry weight of paper. The preferred concentration of the boric acid used is a 5% solution. The pH of the wetting solution should be in the acidic range, that is below about 6.

Various resin pick-up levels are used, depending on the strength required. However, any resin pick-up level of greater than 0.5% should be effective. The pH of the wetting liquid varies from about 3.0 to 5.5 depending on the concentration of the boric acid solution used. The concentration of the boric acid used varies from about 2 to 5% although the preferred concentration is a 5% solution. The amount of this wetting liquid can range from 2 to 20% based on the dry weight of acid to dry weight of paper although a 12% is preferred. Within this permissable range of components and reaction conditions, effective binder solution for pre-moistened tissue paper can be produced.

Though the exact mechanism of the function of the unique glyoxalated polyvinyl alcohol polymeric binder of this invention is not known, it is believed that the equilibrium of hemi-acetal formation in acidic medium by the glyoxalated polyvinyl alcohol and the complex formation of this glyoxalated polyvinyl alcohol with acid e.g. boric acid is accountable for maintaining the strength of the binder treated web when it is treated for a prolonged period in aqueous medium containing boric acid. This can be shown graphically as follows:

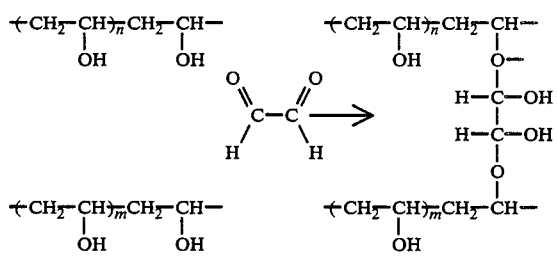

The above glyoxalated polyvinylalcohol was used to treat paper and heated to cure. The treated paper was soaked in an acid medium comprised of boric acid solution. The boric acid forms an insoluble complex with the glyoxalated polyvinyl alcohol in the acidic medium as shown in the following figures.

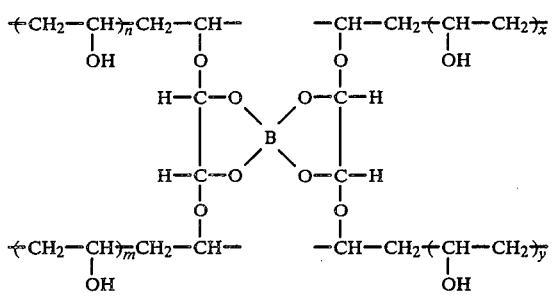

where m, n, x, y, are numbers of repeating structural units ranging from 1, 2, 3, etc.

The complex prevented the dissolving and disintegration of the polymer network and therefore retained the strength in the acidic medium. However, in the presence of an excess of water, as in the flushability test conditions, the structure decomposes and the system will break down to provide good flushability properties.

The following examples are provided as illustrations of the invention and the preferred embodiments, but are not to be construed as being limiting of the degree of the invention as defined in the appended claims.

EXAMPLE 1

Preparation of Glyoxalated Polyvinyl Alcohol (Glyoxal:Polyvinyl Alcohol=1:1 by dry weight)

The polyvinyl alcohol Covol 9740 TM is chosen to be the polyvinyl alcohol used in this example. Covol is a name for grades of polyvinyl alcohols, manufactured by Dural Product Limited. The "97" series has a degree of hydrolysis of 87–89%, while the last two digits in the number after Covol reflects the viscosity of a 4% aqueous solution at 20° C. of the polyvinyl alcohol. Thus Covol 9740 TM is a polyvinyl alcohol having a degree of hydrolysis of 87–89% and the viscosity of its 4% aqueous solution is about 40 cps at 20° C. Another grade of Covol is the "98" series. The "98" series polyvinyl alcohols have a degree of hydrolysis of 98–100%. Once again, the last two digits in the number indicate the viscosity of a 4% aqueous solution at 20° C. of the polyvinyl alcohol.

412.5 grams of water were placed in a 3-necked 1 liter flask and stirred. The water was heated to about 80° C. 25 grams of Covol 9740 TM were added in slowly with stirring. Stirring was continued after the polyvinyl alcohol was added in. After the Covol has completely dissolved, the solution was cooled to 25°–30° C. Then 62.5 grams of 40% glyoxal solution was added in and stirred for 5 minutes. Then the pH of the solution was adjusted to 3.4 with drops of sulfuric acid. (In other cases, sodium hydroxide solution was used to adjust to higher desired pH.) At this stage, additional water might be added to adjust to the required solid. The solution was held at 25°–30° C. until it reached a Brookfield viscosity of 220 cps (LV 2 spindle, 60 rpm at 25° C). The product has the following properties:

| | | |
|---|---|---|
| Brookfield viscosity = (LV2/60/25° C.) | 220 cps | |
| Solid content = | 10% | |
| pH at 25° C. = | 3.40 | |

EXAMPLE 2

Test of Tensile Strength of Pre-moistened Paper with Glyoxalated Covol 9740 TM as made in Example 1

This example showed that glyoxalated polyvinyl alcohol possessed the properties of a binder for the manufacture of pre-moistened paper, i.e., having high initial strength in an acidic wetting medium and the strength drops substantially in neutral water on disposal for flushability. To test this, strips of paper (cut from Whatman Chromatography paper Grade #1 with basis weight of about 80 gm/m$^2$) were saturated in a 4% glyoxalated Covol 9740 TM solution (made as Example 1) and then dried at 105° C. oven for one hour. The strips of paper (2.8 gm) were then soaked in an acid solution with pH adjusted to 3.5 for over night before testing.

Half of the strips were then tested as they were while the other half of the strips were soaked in a water bath (300 ml water at pH 7.2) for one hour before testing. The tensile test was carried out using a Thwing-Albert Electro-hydraulic Tensile Tester model #37-4. An average of 8 tests were reported for each test. The results were as follows:

| | | Wet Tensile (lb/20 mm width) | | |
|---|---|---|---|---|
| Binder Solution | Acid used in Soaking | Acid Soaked | Water Soaked | Drop in Wet Tensile |
| 1:1 glyoxal: Covol 9740 TM (dry wt) | citric acid | 1.39 ± 0.07 | 0.84 ± 0.09 | 39.57% |
| | boric acid | 5.85 ± 0.16 | 0.80 ± 0.10 | 86.32% |
| | phosphoric acid | 1.70 ± 0.08 | 0.87 ± 0.06 | 48.82% |

This showed that the polymer binder gave good strength when wetted in an acidic medium. A drop of about 40 to 86% in wet tensile when soaked in neutral water was an indication of good flushability.

EXAMPLES 3 to 7

Preparation of Glyoxalated Polyvinyl Alcohol of Varying Ratio of Glyoxal to Polyvinyl Alcohol The following examples demonstrated the preparation of different glyoxalated polyvinyl alcohols using different ratio of glyoxal to polyvinyl alcohol with the same type of polyvinyl alcohol. The amount of glyoxal used in these examples varies from 0 to 50% by dry weight compared to the polyvinyl alcohol, Covol 9740 TM, used. These glyoxalated Covol 9740 TM were prepared in ways similar to Example 1 and are summarized in Table I.

Note that Example 3 has 0% glyoxal added. This means that Example 3 is an 8% Covol 9740 TM solution. A solution of polyvinyl alcohol has always been included in series of solutions made and tested under the same conditions. This is for comparison purposes and to show the superiority of our glyoxalated polyvinyl alcohol systems over the corresponding polyvinyl alcohol system when tested under identical conditions.

TABLE I

| Glyoxalated Polyvinyl Alcohols of Different Ratio of Glyoxal to Covol 9740 TM | | |
|---|---|---|
| Example | Ratio of Glyoxal/Covol 9740 TM (dry weight) | Properties (solid, Viscosity @ 25° C.) |
| 3 | 0:1 | 8% 652 cps |
| 4 | 1:1 | 8% 100 cps |

TABLE I-continued

Glyoxalated Polyvinyl Alcohols of Different Ratio of Glyoxal to Covol 9740 TM

| Example | Ratio of Glyoxal/Covol 9740 TM (dry weight) | Properties (solid, Viscosity @ 25° C.) |
|---|---|---|
| 5 | 1:2 | 8% 271 cps |
| 6 | 1:4 | 8% 412 cps |
| 7 | 1:8 | 8% 610 cps |

NOTE:
pH of examples 4 to 7 were adjusted to 5.6 for comparison purposes

EXAMPLES 8 to 12

Preparation of Glyoxalated Polyvinyl Alcohols Using Different Polyvinyl Alcohols The following examples showed the use of different polyvinyl alcohols in preparation with glyoxal. These glyoxalated polyvinyl alcohols were prepared in manners similar to Example 1 with the exception that the ratio of glyoxal to the polyvinyl alcohol used might be changed. The preparation is summarized in Table II.

TABLE II

Glyoxalated Polyvinyl Alcohols Using Different Polyvinyl Alcohols

| Example | Ratio of Glyoxal/PVOH (dry weight) | Properties (solid, Viscosity @ 25° C.) |
|---|---|---|
| 8 | 0:1 (Covol 9700) TM | 4% 6 cps |
| 9 | 1:2 (Covol 9700) TM | 10% 19 cps |
| 10 | 0:1 (Covol 9840) TM | 4% 28 cps |
| 11 | 1:4 (Covol 9840) TM | 8% 171 cps |
| 12 | 1:7 (Covol 9840) TM | 8% 231 cps |

EXAMPLE 13

Comparison of Tensile Strength of Pre-Moistened Paper Treated with Glyoxalated Polyvinyl Alcohols of Different Ratio of Glyoxal to Covol 9740 TM and Their Flushabilities This example compared the wet tensile performance of various glyoxalated Covol 9740 TM including the Covol 9740 TM solution alone (as made in Examples 3 to 7) when applied onto paper. The procedure for the preparation of the pre-moistened paper for the test would be described in detail. A new method for observing flushability was also used. In order to demonstrate flushability of the paper, we also tested commercial toilet tissues as references. The flushability of the pre-moistened paper would be demonstrated by comparing with the degree of disintegration of the commercial toilet tissues subjected to the same flushability test.

13-A Test Method

The tissue paper used in the tests was supplied by a commercial paper mill and had the following properties:

| | |
|---|---|
| Thickness (inch) = | 0.047 ± 0.002 |
| Burst strength (lb/in$^2$) = | 1.52 ± 0.23 |
| Dry Tensile (lb/15 mm) = | 1.10 ± 0.07 |
| Brightness (measured by reflection meter model 670 from Photovolt Corp.) = | 79.9 ± 0.10 |
| Basis weight (gm/m$^2$) = | 25.63 |

The tissue paper was cut into sheets of the size $7\frac{1}{2}'' \times 7''$. The sheets were weighed in an analytical balance before use. The binder solution (diluted to 1%) was sprayed onto the sheets using an air spray gun. It was sprayed in such a way that the binder pick-up was controlled to be the level needed. The paper was then dried for 5 minutes in an 110° C. oven and then conditioned at 22°–25° C. The paper was then re-weighed in the analytical balance to determine the exact pick-up level. Paper sheets with very close resin pick-up levels were grouped and cut into strips of $7\frac{1}{2}'' \times 3''$ with its length parallel to the machine direction of the paper. Each eight of these strips were grouped and rolled and then wetted with 6 ml of the wetting liquid. In all cases in these examples the wetting liquid was 5% boric acid. These wetted strips were sealed in plastic bags for at least over night before testing. The set of paper was then tested as it was by a Thwing-Albert Electro-hydraulic Tensile tester model 37-4. Afterwards, the tested strips were saved for flushability tests.

13-B Flushability Tests

In order to see the flushability performance of the glyoxalated polyvinyl alcohol system, commercial bathroom tissues were tested using the same procedure. The test results were used as references for comparison when the glyoxalated polyvinyl alcohol systems were tested by the same method. The commercial toilet tissues used included:

"Royale" TM, manufactured by Facelle Royale Company of Canada.

"New Delsey" TM and "Delsey Boutique" TM, by the Kimberly Clark Company of Canada.

"Cottonelle" TM, by Scott Paper of Canada.

The procedure of the test was as followed:

A 2.5 gm sample of the toilet tissue was weighed out. The sample was soaked in 700 ml of distilled water in a beaker for 1 minute and then stirred for one, two and three minutes, alternating direction every 15 seconds. The stirring was stopped for 30 seconds between each minute of stirring for observation. The degree of disintegration and de-fibering was observed visually during these 30 second stops and at the end of the third minute of stirring.

The results of the test showed that "New Delsey" TM was the best in disintegration and de-fibering, followed by "Cottonelle" TM and "Royale" TM, while "Delsey Boutique" TM was very poor in disintegration and de-fibering. The results are summarized in Table III.

TABLE III

Flushability Results of Commercial Bathroom Tissues

| | Amount De-Fibered (%) | | |
|---|---|---|---|
| Brand | After 1 Minute | After 2 Minutes | After 3 Minutes |
| New Delsey TM | 75 | 100 | 100 |
| Cottonelle TM | 50 | 100 | 100 |
| Royale TM | 25 | 75 | 100 |
| Delsey Boutique TM | 2 | 20 | 50 |

Using the same method from above, it was found that tissue paper treated with glyoxalated polyvinyl alcohols (Examples 3 to 12) had flushability performance comparable to commercial brands of toilet tissues.

13-C Test Results on Paper Treated with Samples Prepared in Examples 3-7

The series of glyoxalated polyvinyl alcohols using various ratio of glyoxal to Covol 9740 TM prepared in Example 3 to Example 7 were tested by the above test method. The results are summarized in Table IV. An average of 8 tests were reported in each test.

TABLE IV

Wet Tensile Test of Glyoxalated Covol 9740 TM Against Covol 9740 TM

| Example # | Components Glyoxal:Covol 9740 TM (dry weight) | Resin Pick-Up (%) | Apparent Wet Tensile (lb/3 in width) |
|---|---|---|---|
| 3 | 0:1 | 1.09 ± 0.05 | 1.00 ± 0.09 |
| 4 | 1:1 | 1.08 ± 0.05 | 1.53 ± 0.12 |
| 5 | 1:2 | 1.09 ± 0.05 | 1.82 ± 0.34 |
| 6 | 1:4 | 1.09 ± 0.03 | 2.24 ± 0.36 |
| 7 | 1:8 | 1.08 ± 0.03 | 2.25 ± 0.17 |

These results showed that wet strength of glyoxalated polyvinyl alcohol Examples 4 to 7 are substantially better than polyvinyl alcohol (Example 3). Flushability tests showed that all these glyoxalated Covol 9740 TM were just as flushable as the commercial toilet tissue such as "Cottonelle" TM and "Royale" TM.

EXAMPLE 14

Comparison of Tensile Performance of Glyoxalated Covol 9700 TM Against Covol 9700 TM as Made in Examples 8 and 9

Glyoxalated polyvinyl alcohol prepared in Example 9 was tested against Covol 9700 TM (Example 8) by a method similar to Example 13. The results are summarized in the following Table V. Once again, an average of 8 tests were reported in each test. Glyoxalated polyvinyl alcohol was again shown to be substantially better than polyvinyl alcohol in wet tensile property.

TABLE V

Glyoxalated Covol 9700 TM Against Covol 9700 TM in Tensile Strength

| Example # | Components Glyoxal:Covol 9700 TM (dry weight) | Resin Pick-Up (%) | Apparent Wet Tensile (lb/3 in width) |
|---|---|---|---|
| 8 | 0:1 | 0.71 | 0.49 ± 0.02 |
| 9 | 1:2 | 0.62 | 0.67 ± 0.19 |

Flushability tests showed that these binders were just as flushable as the commercial toilet tissue, "New Delsey" TM.

EXAMPLE 15

Comparison of Tensile Performance of Glyoxalated Covol 9840 TM Against Covol 9840 TM as Made in Examples 10 to 12

Glyoxalated polyvinyl alcohol prepared in Examples 11 and 12 were tested against Covol 9840 TM (as Example 10) by a method similar to Example 13. The results are summarized in Table VI. An average of 8 tests were reported in each test.

This again showed that glyoxalated polyvinyl alcohol is superior to polyvinyl alcohol when different types of polyvinyl alcohol are used. Flushability tests showed that these binders had flushability performance better than the commercial toilet tissue "Delsey Boutique" TM but not as good as "Royale" TM.

TABLE VI

Glyoxalated Covol 9840 TM Against Covol 9840 TM in Tensile Performance

| Example # | Components Glyoxal:Covol 9840 TM (dry weight) | Resin Pick-Up (%) | Apparent Wet Tensile (lb/3 in width) |
|---|---|---|---|
| 10 | 0:1 | 1.02 ± 0.01 | 7.60 ± 0.41 |
| 11 | 1:4 | 1.04 ± 0.02 | 8.30 ± 0.55 |
| 12 | 1:7 | 1.04 ± 0.02 | 8.09 ± 0.05 |

EXAMPLE 16

Comparison of Glyoxalated Polyvinyl Alcohol Against Binder Example Used in U.S. Pat. No. 4,117,187

This example illustrated the glyoxalated polyvinyl alcohols against an example used as binder solution for the pre-moistened paper in U.S. Pat. No. 4,117,187 in terms of wet tensile performance when wetted in diluted citric acid and when wetted in water.

The binder example chosen from the patent was Vinac ASB-516 TM, a vinyl acetate-crotonic acid copolymer obtained from Air Products and Chemical Company. A binder solution of this Vinac ASB-516 TM was prepared according to the same procedure as written in Examples 1–4 in the American Can U.S. Pat. No. 4,117,187. According to the procedure, 120 gm of Vinac ASB-516 TM was stirred with 1025 gm distilled water containing 55 gm of 10% sodium hydroxide solution. 200 gm of the concentrate was mixed with 800 gm of water and was heated and stirred to completely dissolve the polymer to give a 2% binder solution.

Paper was then saturated with this binder solution and the different glyoxalated polyvinyl alcohol solutions also at 2% binder concentration, dried and tested according to the method similar to Example 2. The results are summarized in Table VII.

TABLE VII

Tensile Performance of Glyoxalated Polyvinyl Alcohol Against Vinac ASB-516 TM, an Example of Binder Solution from U.S. Pat. No. 4,117,187

| Binder | Polymer Type | Wet Tensile (lb/20 mm width) Acid Soaked | Water Soaked | Drop in W.T. |
|---|---|---|---|---|
| Vinac TM ASB-516 | Vinylacetate-crotonic acid used in Examples 1–4 of U.S. Pat. No. 4,117,187 | 1.19 ± 0.04 | 0.91 ± 0.10 | 23.53% |
| Glyoxal: Covol 9870 TM | Glyoxalated Covol 9870 TM (1:1 dry wt) | 4.34 ± 0.08 | 2.30 ± 0.12 | 47.00% |
| Glyoxal: Covol 9840 TM | Glyoxalated Covol 9840 TM (1:1 dry wt) | 3.51 ± 0.16 | 1.82 ± 0.12 | 48.15% |
| Glyoxal: | Glyoxalated Covol | 1.39 ± 0.07 | 0.84 ± 0.09 | 39.57% |

TABLE VII-continued

Tensile Performance of Glyoxalated Polyvinyl Alcohol Against Vinac ASB-516 TM, an Example of Binder Solution from U.S. Pat. No. 4,117,187

| Binder | Polymer Type | Wet Tensile (lb/20 mm width) Acid Soaked | Water Soaked | Drop in W.T. |
|---|---|---|---|---|
| Covol 9740 TM | 9740 TM (1:1 dry wt) | | | |
| Glyoxal: Covol 9720 TM | Glyoxalated Covol 9720 TM (1:1 dry wt) | 1.34 ± 0.05 | 0.91 ± 0.09 | 31.09% |
| Glyoxal: Covol 9700 TM | Glyoxalated Covol 9700 TM (1:1 dry wt) | 1.48 ± 0.05 | 0.94 ± 0.07 | 36.49% |

EXAMPLE 17

Comparison of Glyoxalated Polyvinyl Alcohols Against Binder Claimed in U.S. Pat. No. 4,117,187

In U.S. Pat. No. 4,117,187, Adams claimed styrene-maleic anhydride copolymer to be a binder for pre-moistened wiper (Claim 6). The example here illustrated the comparison of wet tensile performance of glyoxalated polyvinyl alcohols against a styrene-maleic anhydride copolymer when wetted in acid and in water.

A styrene-maleic anhydride copolymer, a copolymer claimed to be a binder for pre-moistened wiper by Adams, was obtained from Polysciences Inc. A binder solution was prepared according to the same method described in Example 1–4 of the American Can U.S. Pat. No. 4,117,187. 20 gm of the copolymer were mixed with 980 gm distilled water, stirred and heated until the copolymer was completed dissolved.

Paper was then separately saturated with this binder solution, and also the glyoxalated polyvinyl alcohol solutions, dried and tested according to the method similar to Example 2. The results are summarized in Table VIII.

TABLE VIII

Tensile Performance of Glyoxalated Polyvinyl Alcohols Against Styrene-Maleic Anhydride Copolymer as Binder Solution

| Binder | Wet Tensile (lb/20 mm width) Acid Soaked | Water Soaked | Drop in W.T. |
|---|---|---|---|
| Styrene-Maleic Anhydride (Polysciences Inc.) | 0.53 ± 0.02 | 0.50 ± 0.03 | 5.66% |
| Glyoxal:Covol 9870 TM (1:1 dry wt) | 4.34 ± 0.20 | 1.99 ± 0.16 | 54.35% |
| Glyoxal:Covol 9840 TM (1:1 dry wt) | 3.34 ± 0.20 | 1.53 ± 0.07 | 54.19% |

EXAMPLE 18

Comparison of Solubility of a Glyoxalated Polyvinyl Alcohol System Against its Corresponding Polyvinyl Alcohol

In order to demonstrate that the glyoxalated polyvinyl alcohol and its corresponding polyvinyl alcohol were different in structure, this example showed the solubility difference of the two systems when soaked in water. The systems used in this test included:

Example 3: an 8% Covol 9740 TM solution, and
Example 6: an 8% (1:4 dry wt) glyoxalated Covol 9740 TM solution Films of the two binder solutions were casted separately onto a glass plate using a 3 mil draw down bar. The films were then dried in 110° C. oven for 5 minutes. After drying the films were peeled away from the glass plate. Each of these two dried films was placed separately into a 250 ml jar, each containing 50 ml distilled water. The time taken for the film to drop into the jar and stirred to dissolve completely was recorded.

Results showed that:

| Film of | Time to Dissolve Film |
|---|---|
| Example 3 | 15 seconds |
| Example 6 | 40 seconds |

This difference in solubility indicated that the two systems were different in structure in order to give different solubility properties.

EXAMPLE 19

Comparison of Tensile Performance of Glyoxalated Covol 9740 TM Against Covol 9740 TM Using Different Concentrations of Boric Acid as Wetting Agent

Glyoxalated polyvinyl alcohols prepared in Examples 4 to 7 were tested against polyvinyl alcohol Covol 9740 TM (Example 3) by a method similar to Example 13 for tensile performance in different concentrations (2.5% and 1.0%) of boric acid as wetting liquid. The results are summarized as follows in Tables IX and X. An average of 8 tests were reported in each test.

TABLE IX

Tensile Performance of Glyoxalated Covol 9740 TM Against Covol 9740 TM in 2.5% Boric Acid as Wetting Medium

| Example # | Components Glyoxal:Covol 9740 TM (dry wt) | Resin Pick-Up (%) | Apparent W.T. (lb/3 in width) |
|---|---|---|---|
| 3 | 0:1 | 0.90 ± 0.01 | 0.58 ± 0.06 |
| 4 | 1:1 | 0.91 ± 0.02 | 0.71 ± 0.07 |
| 5 | 1:2 | 0.94 ± 0.01 | 1.02 ± 0.17 |
| 6 | 1:4 | 0.88 ± 0.07 | 1.08 ± 0.10 |
| 7 | 1:8 | 0.92 ± 0.03 | 1.01 ± 0.09 |

TABLE X

Tensile Performance of Glyoxalated Covol 9740 TM Against Covol 9740 TM in 1.0% Boric Acid as Wetting Medium

| Example # | Components Glyoxal:Covol 9740 TM (dry wt) | Resin Pick-Up (%) | Apparent W.T. (lb/3 in width) |
|---|---|---|---|
| 3 | 0:1 | 1.26 ± 0.03 | 0.19 ± 0.01 |
| 4 | 1:1 | 1.24 ± 0.05 | 0.22 ± 0.02 |
| 5 | 1:2 | 1.28 ± 0.03 | 0.22 ± 0.01 |
| 6 | 1:4 | 1.27 ± 0.05 | 0.23 ± 0.02 |
| 7 | 1:8 | 1.27 ± 0.02 | 0.20 ± 0.03 |
| No | — | — | 0.13 ± 0.03 |

TABLE X-continued

Tensile Performance of Glyoxalated Covol 9740 ™ Against Covol 9740 ™ in 1.0% Boric Acid as Wetting Medium

| Example # | Components Glyoxal:Covol 9740 ™ (dry wt) | Resin Pick-Up (%) | Apparent W.T. (lb/3 in width) |
|---|---|---|---|
| binder | | | |

We claim:

1. A pre-moistened paper product characterized by having high initial wet strength when wetted with a solution having an acid pH and yet which has substantially lower wet strength when disposed of in a neutral or alkaline pH solution comprising a sheet of non-woven fibrous webs which are bonded together with a binder comprising a copolymer of glyoxal and polyvinyl alcohol, and which is subsequently wetted with an aqueous acid solution to form a bonded sheet of pre-moistened paper.

2. The paper product of claim 1 wherein the sheets are wetted with a boric acid solution containing about 1-5% boric acid by weight.

3. The product of claim 1 wherein the glyoxal and polyvinyl alcohol are reacted in a ratio of about 1:1 to about 1:8 by dry weight to give the copolymer binder.

4. The paper product of claim 3 wherein the polyvinyl alcohol reactant used to produce the glyoxal-polyvinyl alcohol copolymer binder is a hot water soluble polyvinyl alcohol having a degree of hydrolysis of 87-99% and a viscosity at 20° C. of 4-70 cps for a 4% solution.

5. The product of claim 4 wherein the polyvinyl alcohol has a 87-89% degree of hydrolysis and a viscosity of about 40 cps at 20° C. for a 4% solution.

6. The product of claim 5 wherein ratio of glyoxal to polyvinyl alcohol is about 1:4 by dry weight.

7. The paper product of claim 1 wherein the binder treated sheet is packaged in contact with a boric acid solution.

8. The paper product of claim 1 wherein the pre-moistened paper product is packaged in individual sealed packages.

9. The product of claim 1 wherein the binder resin is present in the range of at least about 0.5 to about 3.0% by weight of the final sheet.

10. A process for preparing a pre-moistened paper product which has high wet strength when wetted with a solution having an acid pH and yet which has substantially lower wet strength when disposed in a neutral or alkaline pH solution comprising the steps of:

(a) applying a binder to a sheet of non-woven fibrous webs wherein the binder comprises a copolymer of glyoxal and polyvinyl alcohol;
(b) drying the binder treated sheet prior to wetting; and
(c) wetting the sheet with an aqueous acid solution.

11. The process of claim 10 wherein the binder treated sheet is wetted with an aqueous boric acid solution containing 1-5% boric acid by weight.

12. The process of claim 10 wherein the dried, binder treated sheet is packaged in contact with an aqueous acid solution in a sealed container.

13. The process of claim 10 wherein the copolymer binder is prepared by reacting glyoxal and polyvinyl alcohol in a ratio of about 1:1 to about 1:8 by dry weight.

14. The process of claim 13 wherein the polyvinyl alcohol is a hot water soluble polyvinyl alcohol having an degree of hydrolysis of 87-99% and a viscosity of about 4-70 cps at 20° C. for a 4% solution.

15. The process of claim 10 wherein the dried, binder treated sheet is wetted with an aqueous acid solution prior to packaging.

16. The process of claim 15 wherein the aqueous acid solution is a boric acid solution comprising from about 1-5% boric acid by, weight.

17. The process of claim 16 wherein the boric acid solution has a pH of about 2-6.

18. The process of claim 1 wherein the binder is applied to the webs by spraying.

19. The process of claim 10 wherein the range of binder resin pick-up in the final sheet is in the range of at least about 0.5 to about 3.0% by weight of the final sheet.

20. In a process of preparing a pre-moistened paper product having high wet strength in aqueous acid solution and low-wet strength in a solution having a neutral or alkaline pH by the steps of treating a non-woven fibrous web with a binder and subsequently wetting the binder treated web with aqueous acid solution wherein the improvement comprises the steps of treating the web with a copolymer binder solution of glyoxalated polyvinyl alcohol and then drying the web prior to wetting with aqueous acid solution.

21. The process of claim 20 wherein the glyoxalated polyvinyl alcohol copolymer binder is prepared by reacting glyoxal with a hot water soluble polyvinyl alcohol having a degree of hydrolysis of 87-99% and a viscosity of about 4-70 cps at 20° C. for a 4% solution in a ratio of about 1:1 to about 1:8 glyoxal to polyvinyl alcohol, by dry weight and the aqueous acid solution is a 1-5%, by weight, boric acid solution.

* * * * *